(12) United States Patent
Doerry

(10) Patent No.: US 7,880,672 B1
(45) Date of Patent: Feb. 1, 2011

(54) GENERATING NONLINEAR FM CHIRP RADAR SIGNALS BY MULTIPLE INTEGRATIONS

(75) Inventor: Armin W. Doerry, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 342 days.

(21) Appl. No.: 11/856,309

(22) Filed: Sep. 17, 2007

(51) Int. Cl.
*G01S 13/00* (2006.01)

(52) U.S. Cl. .................. 342/201; 375/139; 342/132

(58) Field of Classification Search .................. 342/201
See application file for complete search history.

(56) References Cited

U.S. PATENT DOCUMENTS

| | | | | | |
|---|---|---|---|---|---|
| 5,574,639 | A | * | 11/1996 | Qian et al. ............... | 708/300 |
| 5,668,900 | A | * | 9/1997 | Little et al. .............. | 385/37 |
| 6,178,207 | B1 | * | 1/2001 | Richards et al. ........... | 375/259 |
| 6,614,813 | B1 | * | 9/2003 | Dudley et al. ............. | 370/532 |

OTHER PUBLICATIONS

A. W. Doerry, "Performance Limits for Synthetic Aperture Radar—second edition", Sandia Report SAND2006-0821, Feb. 2006, pp. 1-70.

J. A. Johnston, A. C. Fairhead, "Waveform design and Doppler sensitivity analysis for nonlinear FM chirp pulses", IEE Proceedings F (Communications, Radar and Signal Processing), vol. 133, No. 2, p. 163-175, Apr. 1986.

Byron M. Keel, Jay A. Saffold, Mark R. Walbridge, John Chadwick, "Non-linear stepped chirp waveforms with sub-pulse processing for range sidelobe suppression", Proceedings of the SPIE—The International Society for Optical Engineering Conference on Radar Sensor Technology III, Orlando, Florida, USA, vol. 3395, p. 87-98, Apr. 16, 1998.

H. D. Griffiths, L. Vinagre, "Design of low-sidelobe pulse compression waveforms", Electron. Lett., vol. 30, No. 12, p. 1004-1005, 1994.

E. De Witte, H. D. Griffiths, "Improved ultra-low range sidelobe pulse compression waveform design", Electronics Letters, vol. 40, No. 22, p. 1448-1450, Oct. 28, 2004.

Lay R. Varshney, Daniel Thomas, "Sidelobe Reduction for Matched Filter Range Processing", Proceedings of the 2003 IEEE Radar Conference Huntsville, AL, USA, p. 446-451, May 5-8, 2003.

C. E. Cook, M. Bernfeld, C. A. Palmieri, "Matched filtering, pulse compression and waveform design—IV", Microwave Journal, vol. 8, No. 1, p. 73-88, Jan. 1965.

* cited by examiner

*Primary Examiner*—Thomas H Tarcza
*Assistant Examiner*—Timothy A Brainard
(74) *Attorney, Agent, or Firm*—Elmer A. Klavetter

(57) ABSTRACT

A phase component of a nonlinear frequency modulated (NLFM) chirp radar pulse can be produced by performing digital integration operations over a time interval defined by the pulse width. Each digital integration operation includes applying to a respectively corresponding input parameter value a respectively corresponding number of instances of digital integration.

20 Claims, 3 Drawing Sheets

GENERATING NONLINEAR FM CHIRP RADAR SIGNALS BY MULTIPLE INTEGRATIONS

This invention was developed under Contract DE-AC04-94AL85000 between Sandia Corporation and the U.S. Department of Energy. The U.S. Government has certain rights in this invention.

FIELD OF THE INVENTION

The invention relates generally to generating chirp radar signals and, more particularly, chirp radar signals with a non-linear chirp.

BACKGROUND OF THE INVENTION

It is well known that when a signal is input to a matched filter (matched to the input signal) then the output of the filter is the autocorrelation function of the signal. Also well known is that the autocorrelation function is the Fourier transform of the signal's power spectral density (PSD). A matched filter provides optimum (maximum) signal-to-noise ratio (SNR) at the peak of its autocorrelation function, and is consequently optimum for detecting the signal in noise.

A very common conventional radar waveform is the Linear FM (LFM) chirp signal. Such a signal can be readily generated by a variety of technologies, and is easily processed by a variety of techniques that ultimately implement a matched filter, or nearly so. However, since a LFM chirp waveform has nearly a rectangular PSD, its autocorrelation function exhibits a sinc( ) function shape, i.e. sin(x)/x, with its attendant problematic sidelobe structure.

Reducing the sidelobes of the matched filter output (actually, increasing the peak to sidelobe ratio) is typically accomplished by linear filtering the output, most often by applying window functions or data tapering during the processing. This additional filtering perturbs the matched filter result to reduce sidelobes as desired. However, since the cumulative filtering is no longer precisely matched to the signal, it necessarily reduces output SNR as well, typically by 1-2 dB (depending on the filtering or weighting function used).

It is well known that non-linear FM (NLFM) chirp modulation can advantageously shape the PSD such that the autocorrelation function exhibits substantially reduced sidelobes from its LFM counterpart. Consequently, no additional filtering is required and maximum SNR performance is preserved. The sidelobe reduction associated with NLFM chirp waveforms can yield a 1-2 dB advantage in SNR as compared to the output of an LFM waveform with equivalent sidelobe filtering. However, precision NLFM chirps are more difficult to design, produce, and process than LFM chirps.

Alternatives to NLFM modulation for shaping the PSD, such as amplitude tapering the transmitted signal, are problematic because efficient power amplification of the waveform typically necessitates operating the hardware in a non-linear manner, e.g. operating the amplifiers in compression. This substantially reduces the ability to maintain precision amplitude tapering. Waveform phase remains unaffected by operating amplifiers in compression.

Radar design aspires to a NLFM waveform that is (1) easily produced, (2) easily processed, and (3) easily designed to meet target performance criteria, including bandwidth constraints and sidelobe reduction goals. The progress of technology now offers the possibility of addressing points (1) and (2). The advent of high-speed digital-to-analog converters (DACs) and high-speed large-scale field programmable gate arrays (FPGAs) currently facilitates generating high-performance precision digital LFM chirp waveforms. The high-speed FPGAs, together with conventionally available high-speed analog-to-digital converters (ADCs) facilitate direct sampling of fairly wide bandwidth signals. Modern high-speed processors permit the use of more complex filtering and detection algorithms.

However, the design of NLFM radar chirp waveforms, and the linkage between design and production of those waveforms, remain as challenges in the radar field. It is therefore desirable to provide solutions that address these and other challenges in the radar field.

DETAILED DESCRIPTION

Figure 1:
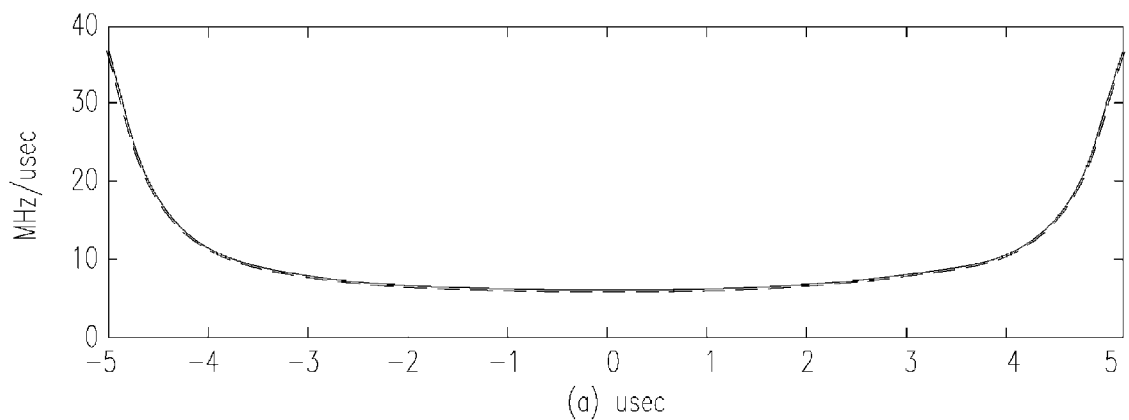
FIG. 1 graphically illustrates a chirp rate function according to exemplary embodiments of the invention.

It is typically advantageous in radar design, as elsewhere, to capture as much of the radar system's performance capability as possible. A single dB of additional SNR gained elsewhere is equivalent to a 25% increase in transmitter power. Alternatively, a single dB of additional SNR can have dramatic effects in reducing false alarm rates in target detection applications. Exemplary embodiments of the invention create NLFM chirp radar waveforms with characteristics that can avoid the aforementioned 1-2 dB of SNR degradation that is typically associated with sidelobe filtering in LFM chirp approaches. In various embodiments, a suitable NLFM chirp radar waveform is produced by using a cascaded digital integration structure, as described in detail hereinbelow.

The present invention is applicable to radar signals with relatively large time-bandwidth products, which are typical in conventional high-performance radar systems. Rayleigh energy criteria infer that for an LFM chirp of constant bandwidth, the associated PSD must be proportional to pulse width. Consequently, under conditions of constant bandwidth, the PSD must be inversely proportional to chirp rate. Furthermore, the principle of stationary phase infers that the major contributor to the spectrum at any frequency $\omega$ is that part of the signal which has instantaneous frequency $\omega$. For a NLFM chirp, this means that the PSD at a particular frequency is inversely proportional to the chirp rate at that particular frequency.

A generic radar waveform, perhaps an FM chirp waveform can be defined as $$X(t) = rect\left(\frac{t}{T}\right)\exp j\Phi(t) \qquad (1)$$

where,
t=time,
T=pulse width, $$rect(z) = \begin{cases} 1 & |z| \leq 1/2 \\ 0 & else \end{cases}, \text{ and}$$

$\Phi(t)$, the phase component of X(t), represents phase as a function of time (2)

The instantaneous frequency is related to phase as $$\omega(t) = \frac{d}{dt}\Phi(t), \qquad (3)$$

and the instantaneous chirp rate is related to frequency as $$\gamma(t) = \frac{d\omega(t)}{dt}. \qquad (4)$$

For a generic chirp signal, the phase becomes $$\Phi(t) = c_0 + \omega_0 t + \iint \gamma(t) dt dt \qquad (5)$$

where
$c_0$=reference phase, and
$\omega_{00}$=reference frequency. (6)

Note that $\gamma(t)$ is the component of $\Phi(t)$ that makes it a chirp. Furthermore, if $\gamma(t)=\gamma_0$ for some constant $\gamma_0$ then this reduces to the LFM case. For the NLFM case, a predominantly "U" shaped $\gamma(t)$ (indicating greater chirp rates at the start and end of a pulse compared to that at the middle) is useful, because it tends to result in a tapering of the PSD at the band edges. Note also that a symmetric $\gamma(t)$ can be expected to have associated therewith a correspondingly symmetric PSD.

Let $\gamma_\omega(\omega)$ represent the chirp rate as a function of frequency. Based on the foregoing analysis, $\gamma_\omega(\omega)$ can be related to a specific window or taper function as $$\gamma_\omega(\omega - \omega_0) = \frac{\gamma_\omega(0)}{W(\omega - \omega_0)} \text{ for } -\frac{\Omega}{2} \leq (\omega - \omega_0) \leq \frac{\Omega}{2} \qquad (7)$$

where
$\omega_0$=the chirp center reference frequency,
$W(\omega)$=the desired taper function for the PSD, and
$\Omega$=the chirp bandwidth of interest. (8)

Note that $\gamma_\omega(w)$ represents the chirp rate at a particular frequency $\omega$, whereas $\gamma(t)$ represents the chirp rate at a particular time. For a typical window or taper function such as W in equation (7), W(0)=1. Furthermore, W (the Fourier transform of the time autocorrelation function) is typically expected to be symmetric about its center.

It is desirable to identify a $\Phi(t)$ that yields the desired $\gamma_\omega(\omega-\omega_0)$. This can be accomplished by finding a specific $\gamma(t)$ that yields the desired $\gamma_\omega(\omega-\omega_0)$. From symmetry considerations, it can be seen that $\omega(0)=\omega_0$. Consequently, $$\gamma_\omega(0)=\gamma(0), \qquad (9)$$

$$\gamma_\omega\left(\frac{\Omega}{2}\right) = \gamma\left(\frac{T}{2}\right),$$

and more generally $$\gamma_\omega(\omega(t)-\omega_0)=\gamma(t). \qquad (10)$$

Substituting from equations (9) and (10) into equation (7), $$\gamma(t) = \frac{\gamma(0)}{W(\omega(t) - \omega_0)}. \qquad (11)$$

The following bandwidth constraint is applicable to $\gamma(t)$ $$\int_{-T/2}^{T/2} \gamma(t)\,dt = \Omega. \qquad (12)$$

The following iterative procedure can be used, for example, to find $\gamma(t)$:
1) select an initial $\gamma(t)$ consistent with a LFM chirp, i.e. $\gamma(t)=\Omega/T$.
2) Integrate $\gamma(t)$ to calculate $\omega(t)$.
3) Adjust (e.g., scale) $\gamma(t)$ and $\omega(t)$ to satisfy the $\Omega$ constraint of equation (12).
4) Calculate $W(\omega(t)-\omega_0)$ and $\gamma(0)$.
5) Calculate a new $\gamma(t)$ using equation (11).
6) Repeat steps 2-5 until convergence.

This iterative procedure is only one example of determining $\gamma(t)$ for a desired W. There are other well-known ways to accomplish this.

A brief discussion of conventional LFM chirp signals is provided here to facilitate expostion. An LFM chirp signal can be described with quadratic phase function $$\Phi(t) = c_0 + c_1 t + \frac{c_2}{2}t^2 \qquad (14)$$

where,
$c_0$=reference phase,
$c_1$=reference frequency, $c_2$=nominal constant chirp rate. (15)

The signal phase $\Phi(t)$ is easily generated parametrically with a double integration. More particularly, $$\Phi(t) = \left[c_0 + c_1 t + \frac{c_2}{2}t^2\right] = c_0 + \int\left[c_1 + \int c_2 dt\right]dt. \qquad (16)$$

The digital hardware counterpart to an analog integrator is an accumulator, so equation (16) can be implemented in digital hardware. A conventional radar system uses the phase $\Phi(t)$ produced by equation (16) to generate a chirp waveform such as $X(t)$ in equation (1).

Exemplary embodiments of the invention recognize and exploit the fact that a NLFM chirp signal can be described as a polynomial phase function $$\Phi(t) = \sum_{n=0}^{N} \frac{c_n}{n!} t^n = \qquad (17)$$

$$c_0 + \int \left[ c_1 + \int \left[ c_2 + \int \left[ c_3 + \ldots \int [c_n] dt \ldots \right] dt \right] dt \right] dt$$

Equation (17) integrates over the duration of the chirp pulse, namely the interval $$-\frac{T}{2} \leq t \leq \frac{T}{2}.$$

When $c_n=0$ for $n>2$, equation (17) reduces to an LFM chirp. Note also that, for embodiments wherein the PSD tapering is to be symmetrical, $c_n=0$ for odd $n>2$, that is, for $n=3, 5, 7, \ldots$ Advantageously, the NLFM chirp signal can be generated parametrically with cascaded digital integrations (i.e., accumulations). The instantaneous frequency for the signal of equation (17) is $$\omega(t) = \frac{d}{dt} \left\{ \sum_{n=0}^{N} \frac{c_n}{n!} t^n \right\} = \sum_{n=1}^{N} \frac{c_n}{(n-1)!} t^{n-1}. \qquad (18)$$

The chirp rate is then $$\gamma(t) = \frac{d}{dt} \omega(t) = \sum_{n=2}^{N} \frac{c_n}{(n-2)!} t^{n-2}. \qquad (20)$$

A phase polynomial of order N thus requires a chirp rate polynomial of order (N−2).

Exemplary embodiments of the invention specify the phase polynomial coefficients ($c_n$) such that the desired sidelobe reduction can be approximated. Some embodiments use a phase polynomial having phase coefficients that provide acceptable approximation to a known filter function, for example an amplitude weighting (window) function, or another suitable tapering function (see W in equation (7)). Some embodiments determine the phase polynomial coefficients by using conventional techniques to curve-fit the phase polynomial to the desired filter function. In various embodiments, the phase polynomial is fitted to, for example, Taylor or Gaussian weighting functions. Some embodiments use phase polynomials of order N=12, fitted to achieve a Taylor weighting with −35 dB sidelobes and $\bar{n}$=4. Some embodiments use phase polynomials of order N=8, fitted to achieve a Taylor weighting with −35 dB sidelobes and $\bar{n}$=4. Some embodiments use phase polynomials of order N=8, fitted to achieve a Taylor weighting with −30 dB sidelobes and $\bar{n}$=3. Some embodiments use phase polynomials of order N=6, fitted to achieve a Taylor weighting with −20 dB sidelobes and $\bar{n}$=3. Some embodiments use phase polynomials of order N=6, fitted to a Gaussian weighting with $\alpha$=1.4. Some embodiments use phase polynomials of order N=4, fitted to a Gaussian weighting with $\alpha$=1.2. Any of a multitude of window functions can be approximated to arbitrary accuracy by sufficiently increasing N.

Figure 2:
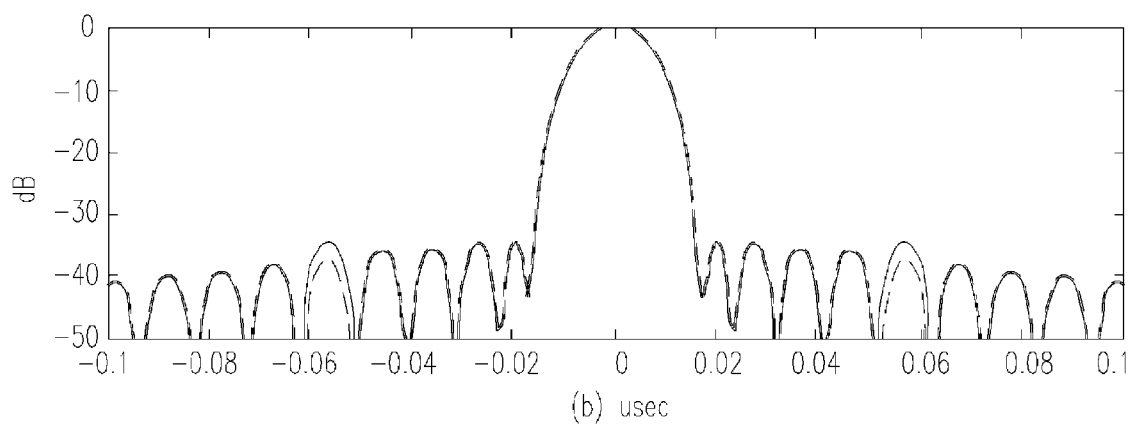
FIG. 2 graphically illustrates the autocorrelation function associated with the chirp rate function of FIG. 1.

FIGS. 1 and 2 graphically illustrate simulation results for the aforementioned example of a phase polynomial of order N=12, fitted to achieve a Taylor weighting with −35 dB sidelobes and $\bar{n}$=4. FIG. 1 shows the chirp rate function, and FIG. 2 shows the corresponding autocorrelation function. In FIGS. 1 and 2, solid lines represent simulation results, and dotted lines represent ideal behavior.

Figure 3:
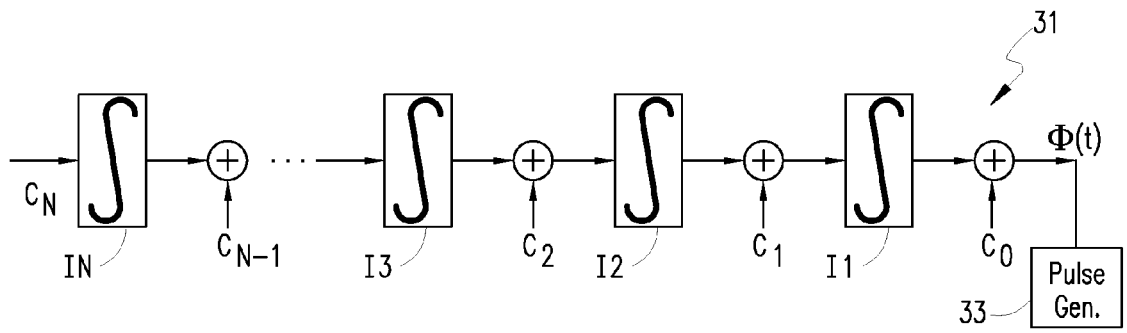
FIG. 3 diagrammatically illustrates a NLFM chirp radar apparatus according to exemplary embodiments of the invention.

FIG. 3 diagrammatically illustrates a NLFM chirp radar apparatus according to exemplary embodiments of the invention. The apparatus of FIG. 3 includes a digital integration unit 31 that is capable of implementing equation (17) to produce $\Phi(t)$. The digital integration unit 31 includes N digital integrators (e.g., digital accumulators) I1-IN, suitably coupled to N summing elements to implement the order N phase polynomial of equation (17). An input of the FIG. 3 apparatus receives the set of parameter values $c_0$-$c_N$. To implement the order N phase polynomial of equation (17), the parameter value $c_N$ is provided as an input directly to the digital integrator IN, and the remaining parameter values are provided as inputs to respectively corresponding ones of the summing elements. The summing elements have further inputs that respectively receive the outputs of the digital integrators I1-IN. The output of the "$c_0$" summing element is $\Phi(t)$, which is provided to a radar pulse generation unit 33 that can generate $X(t)$ (see equation (1)) according to conventional techniques. An example of a conventional pulse generation unit is described in U.S. Pat. No. 6,614,813, which is incorporated herein by reference.

For a phase function that is described by a polynomial of order N, the Nth time derivative of the phase function has a constant value over the time interval T defined above, and the (N−1)th time derivative of the phase function is linear over the time interval T. Some embodiments of the present invention permit the Nth time derivative to vary during the time interval T. For example, in some embodiments, the Nth time derivative is not a single constant value throughout T, but is rather a sequence of values that can differ from one another. Each value of the sequence obtains during some sub-interval within the interval T. That is $$\frac{d^N}{dt^N} \Phi(t) = \sum_{m=1}^{M} b_m rect\left(\frac{t - t_m}{\tau_m}\right) \qquad (21)$$

where
  m=interval index with $1 \leq m \leq M$,
  $t_m$=center reference time of the mth sub-interval in T,
  $\tau$=the width of the mth interval, and $$b_m = \text{the sequence of values} \qquad (22)$$

In some embodiments, the intervals are non-overlapping, and span the pulse width, $$\sum_{m=1}^{M} \tau_m = T. \qquad (23)$$

Note that, if the Nth time derivative of $\Phi(t)$ is a sequence of values that can differ from one another, then the (N-1)th time derivative of $\Phi(t)$ is piece-wise linear.

The following polynomial phase function corresponds to derivative equation (21)

$$\Phi(t) = \int \cdots \int \left[\sum_{m=1}^{M} b_m rect\left(\frac{t-t_m}{\tau_m}\right)\right] dt^N = c_0 + \int \left[c_1 + \right. \quad (21.1)$$

$$\left. \int \left[c_1 + \int \left[c_2 + \cdots \int \left[\sum_{m=1}^{M} b_m rect\left(\frac{t-t_m}{\tau_m}\right)\right] dt \cdots\right] dt\right] dt\right]$$

Equation (21.1) integrates over the duration of the chirp pulse, namely the interval $$-\frac{T}{2} \le t \le \frac{T}{2}.$$

Note that when M=1 in equation (21.1), this degenerates into the polynomial phase function of equation (17).

Various embodiments according to equations (21) and (21.1) have the following characteristics. Some embodiments choose each value of the $b_m$ parameter as some function of the desired behavior of the Nth derivative of $\Phi(t)$ during the sub-interval $\tau_m$. The behavior of the Nth derivative is readily derived from the known chirp rate function $\gamma(t)$ described above. In some embodiments, each value of $b_m$ is derived from a representative sample of $\gamma(t)$ within $\tau_m$. Some embodiments derive each value of $b_m$ from a mean value of all $\gamma(t)$ samples within $\tau_m$. In some embodiments, all sub-interval widths $\tau_m$ are equal. The remaining parameter values $c_0$-$c_{n-1}$ of the polynomial phase function $\Phi(t)$ are, in some embodiments, determined by fitting the phase polynomial to a desired filter function as described above with respect to FIGS. 1-3. Some embodiments use N=2 and M=10, with the parameter values $c_0$-$c_{N-1}$ fitted to achieve a Taylor weighting with -35 dB sidelobes and $\bar{n}$=4. Some embodiments use N=2 and fit $c_0$-$c_{N-1}$ to the same Taylor weighting, but set M=40. Some embodiments fit $c_0$-$c_{N-1}$ to the same Taylor weighting, with N=3 and M=40. Some embodiments use N=3 and M=10, with $c_0$-$c_{n-1}$ fitted to achieve Taylor weighting with -20 dB sidelobes and $\bar{n}$=3. Any of a multitude of window functions can be approximated to arbitrary accuracy by sufficiently increasing N and/or M.

Figure 4:
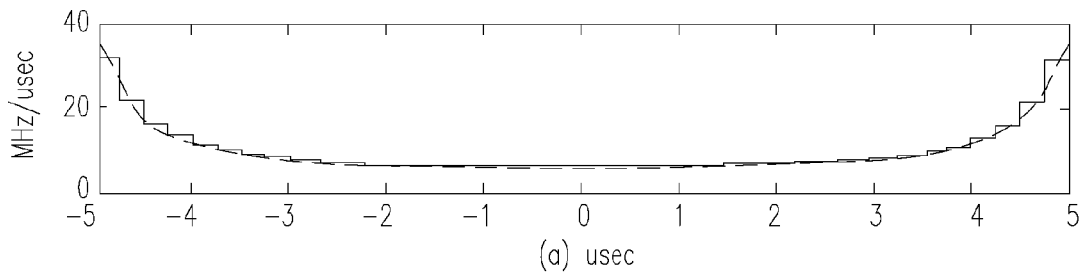
FIG. 4 graphically illustrates a chirp rate function according to exemplary embodiments of the invention.
Figure 5:
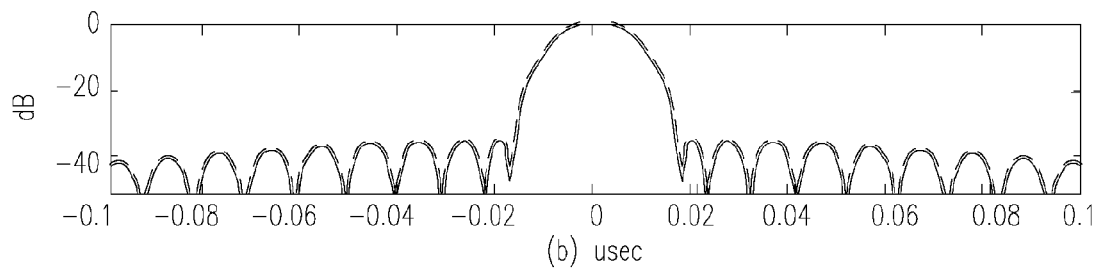
FIG. 5 graphically illustrates the autocorrelation function associated with the chirp rate function of FIG. 4.

FIGS. 4 and 5 graphically illustrate simulation results for the aforementioned example of N=2 and M=40, with the parameter values $c_0$-$c_{N-1}$ fitted to achieve a Taylor weighting with -35 dB sidelobes and $\bar{n}$=4. FIG. 4 shows the chirp rate function, and FIG. 5 shows the corresponding autocorrelation function. In FIGS. 4 and 5, solid lines represent simulation results, and dotted lines represent ideal behavior.

Figure 6:
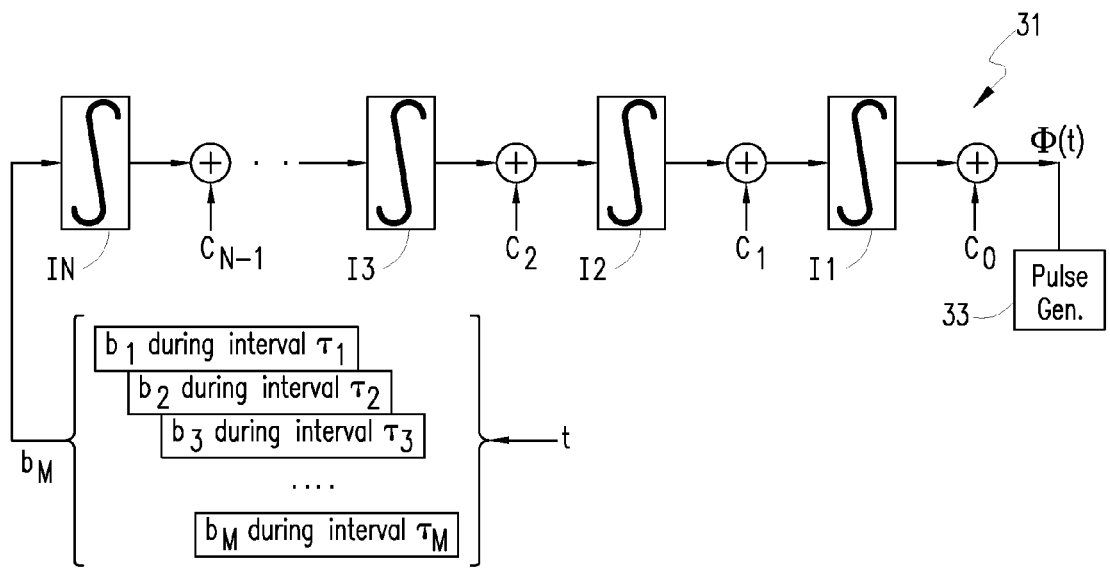
FIG. 6 diagrammatically illustrates a NLFM chirp radar apparatus according to exemplary embodiments of the invention.

FIG. 6 diagrammatically illustrates a NLFM chirp radar apparatus according to exemplary embodiments of the invention. The apparatus of FIG. 6 is generally similar to that of FIG. 3, except equation (21.1) is implemented, by replacing $c_N$ with a sequence of $b_m$ values determined as described above with respect to equation (21).

Some embodiments effectively choose $t_m$ and $\tau_m$ in equation (21) as a function of instantaneous frequency $\omega(t)$. Thus, the values of the $b_m$ parameter can be adjusted more or less often depending on frequency changes. This can be modeled as $$\frac{d^N}{dt^N}\Phi(t) = \sum_{m=1}^{M} b_m rect\left(\frac{\omega(t)-\omega_m}{\Omega_m}\right), \quad (24)$$

where
m=interval index with $1 \le m \le M$,
$\omega_m$=center reference frequency of the mth frequency interval,
$\Omega_m$=the bandwidth of the mth frequency interval, and $b_m$=the sequence of values. (25)

In some embodiments, the frequency intervals are non-overlapping, and span the bandwidth, $$\sum_{m=1}^{M} \Omega_m = \Omega. \quad (26)$$

The following polynomial phase function corresponds to derivative equation (24)

$$\Phi(t) = \int \cdots \int \left[\sum_{m=1}^{M} b_m rect\left(\frac{\omega(t)-\omega_m}{\Omega_m}\right)\right] dt^N = \quad (24.1)$$

$$c_0 + \int \left[c_1 + \int \left[c_2 + \cdots \int \left[\sum_{m=1}^{M} b_m rect\left(\frac{\omega(t)-\omega_m}{\Omega_m}\right)\right] dt \cdots\right] dt\right] dt$$

where $$\omega(t) = \frac{d}{dt}\Phi(t). \quad (24.2)$$

Equation (24.2) can also be written as follows $$\omega(t) = c_1 + \int \left[c_2 + \cdots \int \left[\sum_{m=1}^{M} b_m rect\left(\frac{\omega(t)-\omega_m}{\Omega_m}\right)\right] dt \cdots\right] dt \quad (24.3)$$

and equation (24.1) can also be written as follows $\Phi(t) = c_0 + \int \omega(t) dt$ (24.4)

The integrations in equations (24.1), (24.3) and (24.4) occur over the duration of the chirp pulse, namely the interval $$-\frac{T}{2} \le t \le \frac{T}{2}.$$

Various embodiments according to equations (24)-(24.4) have the following characteristics. Some embodiments choose each value of the $b_m$ parameter as some function of the desired behavior of the Nth derivative of $\Phi(t)$ over the frequency interval $\Omega_m$. The behavior of the Nth derivative is readily derived from the known chirp rate function $\gamma(t)$ described above. In some embodiments, each value of $b_m$ is derived from a representative sample of $\gamma(t)$ within $\Omega_m$. Some embodiments derive each value of $b_m$ from a mean value of all $\gamma(t)$ samples within $\Omega_m$. In some embodiments, all bandwidths $\Omega_m$ are equal. The remaining parameter values $c_0$–$c_{N-1}$ of the polynomial phase function $\Phi(t)$ are, in some embodiments, determined by fitting the phase polynomial to a desired filter function as described above. Some embodiments use N=2 and M=10, with the parameter values $c_0$–$c_{N-1}$ fitted to achieve a Taylor weighting with −35 dB sidelobes and $\bar{n}$=4. Some embodiments use N=2 and fit $c_0$–$c_{N-1}$ to the same Taylor weighting, but set M=40. Some embodiments fit $c_0$–$c_{N-1}$, to the same Taylor weighting, with N=3 and M=40. Some embodiments use N=3 and M=10, with $c_0$–$c_{N-1}$ fitted to achieve Taylor weighting with −20 dB sidelobes and $\bar{n}$=3. Any of a multitude of window functions can be approximated to arbitrary accuracy by sufficiently increasing N and/or M.

Figure 7:
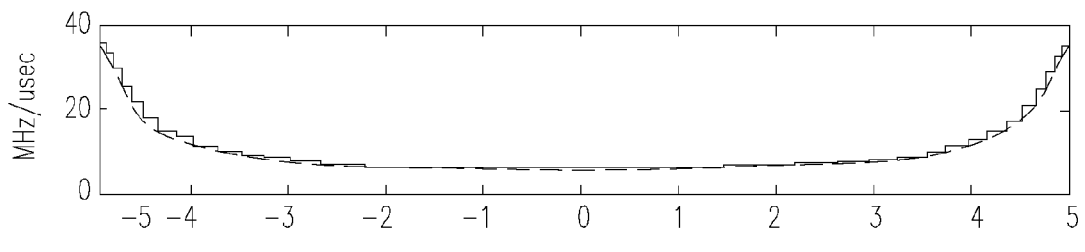
FIG. 7 graphically illustrates a chirp rate function according to exemplary embodiments of the invention.
Figure 8:
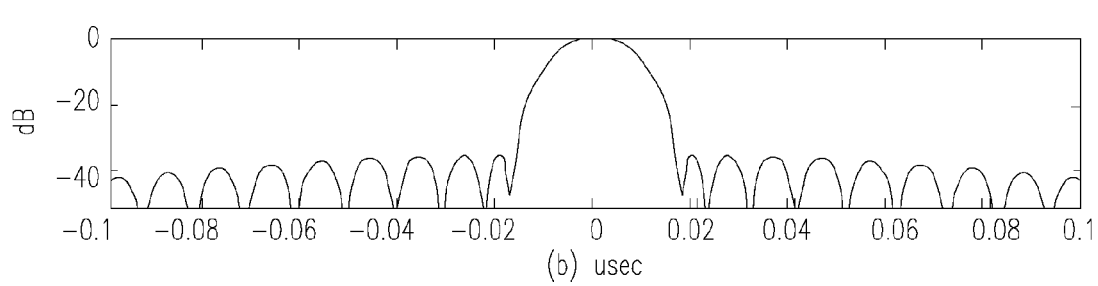
FIG. 8 graphically illustrates the autocorrelation function associated with the chirp rate function of FIG. 7.

FIGS. 7 and 8 graphically illustrate simulation results for the aforementioned example of N=2 and M=40, with the parameter values $c_0$–$c_{N-1}$ fitted to achieve a Taylor weighting with −35 dB sidelobes and $\bar{n}$=4. FIG. 7 shows the chirp rate function, and FIG. 8 shows the corresponding autocorrelation function. In FIGS. 7 and 8, solid lines represent simulation results, and dotted lines represent ideal behavior.

Figure 9:
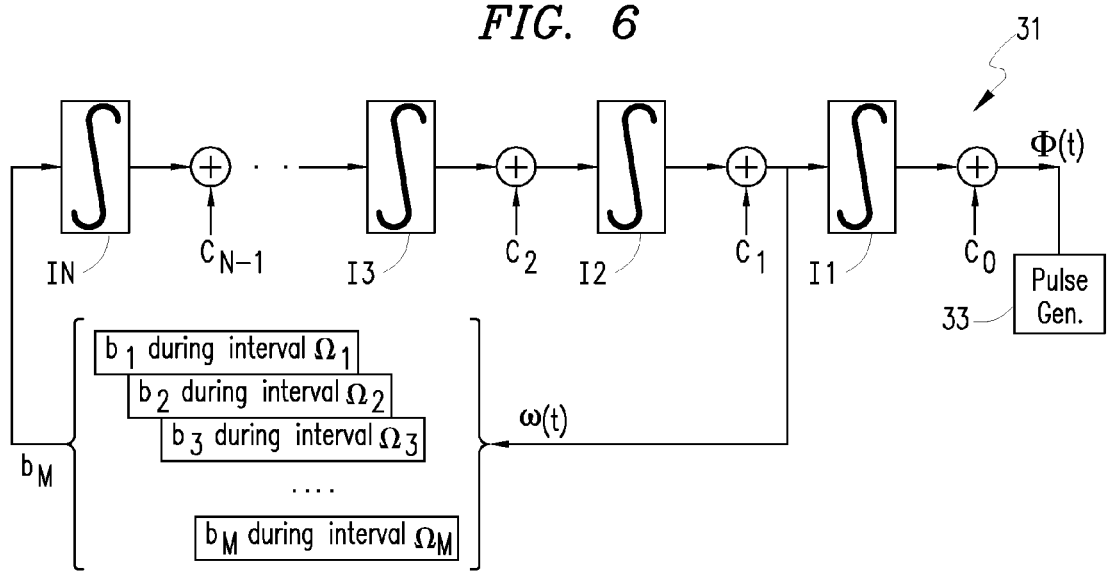
FIG. 9 diagrammatically illustrates a NLFM chirp radar apparatus according to exemplary embodiments of the invention.

FIG. 9 diagrammatically illustrates a NLFM chirp radar apparatus according to exemplary embodiments of the invention. The apparatus of FIG. 9 is generally similar to that of FIG. 6, except equation (24.4) is implemented, by replacing time intervals of width $\tau_m$ centered at $t_m$ with frequency bands of width $\Omega_m$ centered at $\Omega_m$, as described above (see equations (21) and (24)).

Some embodiments generate the NLFM chirp rate as some combined function of instantaneous frequency and time. In various embodiments, this combined function can be linear or nonlinear, continuous or discontinuous, with derivatives that may exist or not.

Although exemplary embodiments of the invention have been described above in detail, this does not limit the scope of the invention, which can be practiced in a variety of embodiments.

What is claimed is:

1. An apparatus for producing a phase component of a nonlinear frequency modulated (NLFM) chirp radar pulse, comprising:
    an input for receiving a set of parameter values defined externally of said apparatus; and
    a digital integration unit coupled to said input, said digital integration unit configured to perform a plurality of digital integration operations over a time interval defined by a width of the NLFM chirp radar pulse, said digital integration unit configured to perform each said digital integration operation by applying to a respectively corresponding one of said parameter values a respectively corresponding number of instances of digital integration, and said digital integration unit configured to produce said phase component based on said plurality of digital integration operations;
    wherein one of said parameter values is defined as a variable parameter value for variation during said time interval.

2. The apparatus of claim 1, wherein said digital integration unit approximates a desired filter characteristic based on said set of parameter values.

3. The apparatus of claim 2, wherein a remainder of said parameter values are curve-fitted to the desired filter characteristic.

4. The apparatus of claim 1, wherein said variable parameter value is defined for said variation based on a desired chirp rate characteristic of the NLFM chirp radar pulse.

5. The apparatus of claim 4, wherein said variable parameter value is defined for said variation based on elapsed time during said time interval.

6. The apparatus of claim 4, wherein said variable parameter value is defined for said variation based on variation of said phase component during said time interval.

7. The apparatus of claim 4, wherein said variable parameter is defined for said variation based on at least one of elapsed time during said time interval and variation of said phase component during said time interval.

8. The apparatus of claim 1, wherein said digital integration unit is configured to apply more instances of digital integration to said variable parameter value than to any of a remainder of said parameter values.

9. The apparatus of claim 1, wherein said digital integration unit includes at least three digital integrators.

10. The apparatus of claim 1, wherein said variable parameter value is defined to be associated with a plurality of values from which said variable parameter, value is selected.

11. An apparatus for producing a nonlinear frequency modulated (NLFM) chirp radar signal, comprising:
    an input for receiving a set of parameter values defined externally of said apparatus;
    a radar pulse generator for producing a constituent NLFM chirp radar pulse of the NLFM chirp radar signal based on a phase component associated with the NLFM chirp radar pulse; and
    a digital integration unit coupled to said input and said radar pulse generator, said digital integration unit configured to perform a plurality of digital integration operations over a time interval defined by a width of the NLFM chirp radar pulse, said digital integration unit configured to perform each said digital integration operation by applying to a respectively corresponding one of said parameter values a respectively corresponding number of instances of digital integration, and said digital integration unit configured to produce said phase component based on said plurality of digital integration operations;
    wherein one of said parameter values is defined as a variable parameter value for variation during said time interval.

12. A method of producing a phase component of a nonlinear frequency modulated (NLFM) chirp radar pulse, comprising:
    defining a set of parameter values;
    performing a plurality of digital integration operations over a time interval defined by a width of the NLFM chirp radar pulse, wherein each said digital integration operation includes applying to a respectively corresponding one of said parameter values a respectively corresponding number of instances of digital integration; and
    producing said phase component based on said plurality of digital integration operations;
    wherein said set of parameter values are defined without performing digital integration, and one of said parameter values is defined as a variable parameter value for variation during said time interval.

13. The method of claim 12, including approximating a desired filter characteristic based on said set of parameter values.

14. The method of claim 13, wherein a remainder of said parameter values are curve-fitted to the desired filter characteristic.

15. The method of claim 12, wherein said variable parameter value is defined for said variation based on a desired chirp rate characteristic of the NLFM chirp radar pulse.

16. The method of claim 15, wherein said variable parameter value is defined for said variation based on elapsed time during said time interval.

17. The method of claim 15, wherein said variable parameter value is defined for said variation based on variation of said phase component during said time interval.

18. The method of claim 15, wherein said variable parameter value is defined for said variation based on at least one of elapsed time during said time interval and variation of said phase component during said time interval.

19. The method of claim 12, wherein said applying includes applying more instances of digital integration to said variable parameter value than to any of a remainder of said parameter values.

20. The method of claim 12, wherein said defining includes associating said variable parameter value with a plurality of values from which said variable parameter value is selected.

* * * * *